United States Patent [19] [11] Patent Number: 5,596,374
Sumiyoshi et al. [45] Date of Patent: Jan. 21, 1997

| [54] | TELEVISION RECEIVER THAT CONTROLS DISPLAY CONTRAST BASED ON THE TYPE OF VIDEOS BEING DISPLAYED |
|---|---|
| [75] | Inventors: Hajime Sumiyoshi; Takeshi Namikawa, both of Saitama-ken, Japan |
| [73] | Assignee: Kabushiki Kaisha Toshiba, Kawasaki, Japan |
| [21] | Appl. No.: 520,247 |
| [22] | Filed: Aug. 28, 1995 |
| [30] | Foreign Application Priority Data |

Aug. 29, 1994 [JP] Japan .................................. 6-203711
[51] Int. Cl.⁶ .................. H04N 7/22; H04N 7/14
[52] U.S. Cl. ..................... 348/673; 348/569; 348/678
[58] Field of Search ..................... 348/678, 686, 348/673, 569, 563, 687; H04N 7/22, 7/14

[56] References Cited

U.S. PATENT DOCUMENTS

| 4,451,840 | 5/1984 | Shanley, II | 358/22 |
| 5,345,278 | 9/1994 | Choi | 348/686 |
| 5,386,247 | 1/1995 | Shafer et al. | 348/687 |
| 5,481,318 | 1/1996 | Flowers | 348/686 |

FOREIGN PATENT DOCUMENTS

| 454431 | 8/1992 | Japan . |
| 3183845 | 7/1993 | Japan . |

Primary Examiner—John K. Peng
Assistant Examiner—Glenton B. Burgess
Attorney, Agent, or Firm—Cushman, Darby & Cushman

[57] ABSTRACT

A television receiver includes a first signal processing unit that generates contrast controlled first R, G and B signals and a second signal processing unit that outputs second on-screen R, G and B signals. A switching unit receives the first and second R, G and B signals and selectively outputs one of them to a color CRT. An ABL voltage, which changes in response to a level of video displayed on the CRT, is provided to the first and the second R, G and B signals. A control unit determines whether to execute the contrast control of the second R, G and B signals based on a ratio of video corresponding to the second R, G and B signals out of the total video displayed on the color CRT.

4 Claims, 4 Drawing Sheets

TELEVISION RECEIVER THAT CONTROLS DISPLAY CONTRAST BASED ON THE TYPE OF VIDEOS BEING DISPLAYED

FIELD OF THE INVENTION

1. Field of the Invention

The present invention generally relates to a television receiver which selectively switches R, G and B television signals and on-screen display R, G and B signals and displays them on a color CRT, and more particularly, to a television receiver which is capable of improving the image quality by on-screen display of R, G and B signals.

2. Description of the Related Art

On-screen display television receivers which numerically display information relative to channel, sound volume, etc. have been widely in use in recent years.

In such on-screen display type television receivers, analog R, G and B signals for on-screen display and ordinary television broadcasting R, G and B signals are selectively switched and displayed on the screen of a CRT. Further, such on-screen television receivers are provided with an automatic contrast limit (hereinafter referred to as ACL) circuit which controls the contrast according to an automatic brightness limit (hereinafter referred to as ABL) voltage. The ABL voltage change follows the increase of beam current of a CRT and the ACL circuit limits the contrast using this ABL voltage. Normally, the contrast limit is applied to R, G and B signals of television broadcasting signals but is generally not applied to R, G and B signals for on-screen display.

In television receivers where the ACL operation is not applied to on-screen display R, G and B signals, when on-screen characters are displayed on the whole screen, if a ratio of the on-screen display occupying the whole screen is relatively large, excessive signals are applied to the CRT as the ACL cannot be applied. As a result, the CRT and a high voltage circuit may be destroyed or early deterioration may result. On the other hand, in order to cope with such situation, it is better to limit application of excessive signals in advance but less pictures contrast will result.

To cope with this, there is a television receiver which applies the ACL operation constantly to on-screen R, G and B signals.

FIG. 4 is a block diagram showing such a television receiver.

In FIG. 4, Reference Numeral 90 is a color signal reproduction circuit to reproduce red (R), green (G) and blue (B) signals (hereinafter, referred to television R, G and B signals) from TV broadcasted video signals, and television R, G and B signals a3R, a3G and a3B provided to an input terminal 91 from this color signal reproduction circuit 90 are supplied to a switching circuit 92.

Further, Reference Numeral 99 is an on-screen display signal generator and analog R, G and B signals b3R, b3G and b3B provided to an input terminal 93 from this on-screen display signal generator 99 are supplied to a contrast controller 94.

On the other hand, Reference Numeral 100 is an ABL circuit which generates ABL signals that change following the anode current of a color CRT 101 as a display unit. ABL voltage Va3 from the ABL circuit 100 is provided to an input terminal 95. The ABL voltage Va3 provided to this input terminal 95 is supplied to an ACL controller 96.

The ACL controller 96 generates contrast control voltage Vb3 using the supplied ABL voltage Va3 and supplies the contrast control voltage Vb3 to the contrast controller 94.

The contrast controller 94 adjusts the contrast by adjusting the amplitudes of the R, G and B signals b3R, b3G and b3B supplied from the input terminal 93 based on the supplied contrast control voltage Vb3 and provides the contrast adjusted R, G and B signals c3R, c3G and c3B to a clamper 97. This clamper 97 reproduces DC components for R, G and B signals c3R, c3G and c3B and provides them to the switching circuit 92 as on-screen R, G and B signals d3R, d3G and d3B.

A switching signal e3 showing a timing to display the on-screen R, G and B signals d3R, d3G and d3B is provided to an input terminal 98 of this switching circuit 92. The switching signal e3 has a high level at a timing to display the on-screen R, G and B signals d3R, d3G and d3B and is kept at a low level in other cases.

This switching circuit 92 selectively switches and outputs input on-screen R, G and B signals and TV R, G and B signals based on switching signal e3.

The switching circuit 92 selects the on-screen R, G and B signals d3R, d3G and d3B from the clamper 17 and leads them to a color CRT when the switching signal e3 is at the high level and selects the television R, G and B signals a3R, a3G and a3B from the input terminal 91 and leads them to a color CRT when the switching signal e3 is at the low level.

In a television receiver using such a conventional analog RGB signal process circuit, the contrast is adjusted by the contrast controller 94 and R, G and B signals d3R, d3G and d3B with DC components reproduced by the contrast controller 97 are selected during the period when the on-screen R, G and B signals d3R, d3G and d3B are displayed on a color CRT. The ACL controller 96 generates the contrast control voltage Vb3 from the supplied ABL voltage Va3 and supplies to the contrast controller 94 for the constant execution of the ACL operation.

In the a conventional television receiver as described above, it is possible to apply the ACL operation to on-screen R, G and B signals constantly, but in a mode where the on-screen display ratio is relatively small such as a channel display mode, etc., the contrast of on-screen characters changes corresponding to the level of TV signal applied and brightness changes unnecessarily, thus giving an unnatural impression to TV viewers.

In a conventional television receiver in which the ACL operation is applied to on-screen display R, G and B signals, if a ratio of on-screen display occupied in the whole screen is less in a mode such as a channel display mode, etc., the contrast of on-screen displayed characters changes corresponding to the level of TV signal applied and brightness changes unnecessarily, giving an unnatural impression to TV viewers.

SUMMARY OF THE INVENTION

It is, therefore, an object of the present invention to provide a television receiver capable of eliminating the problem described above by selecting whether the contrast control should be executed on the on-screen display R, G and B signals corresponding to ABL voltage under prescribed conditions.

In order to achieve the above object, a television receiver according to one aspect of the present invention includes first signal processing means for receiving television signals and generates contrast controlled first R, G and B signals; second signal processing means for making it possible to control the contrast by inputting second on-screen R, G and B signals; switching means for inputting the first and second R, G and B signals from the first and the second signal processing means and selectively to outputting them; a color CRT to which selected outputs are supplied from the switching means for displaying video image by the selected outputs; means for generating an ABL voltage that changes corresponding to level of video displayed on the color CRT to supplying the voltage to the first and the second signal processing means for the contrast control of the first and the second R, G and B signals; and control means for controlling the execution and prohibition of the contrast control of the second R, G and B signals to execute the contrast control if a ratio of video by the second R, G and B signals out of the video displayed on the color CRT exceeds a prescribed level and to prohibit the contrast control if it is below the prescribed level.

According to a television receiver of the present invention, the control means executes the contrast control using the ABL voltage if a ratio of video by the second on-screen display R, G and B signals out of the videos displayed on the color CRT is in excess of a prescribed level while prohibiting the contrast control if it is below the prescribed level. It is therefore possible to decide whether the contrast control corresponding to the ABL voltage should be executed or not according to a prescribed condition.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention will be explained with reference to the drawings.

Figure 1:
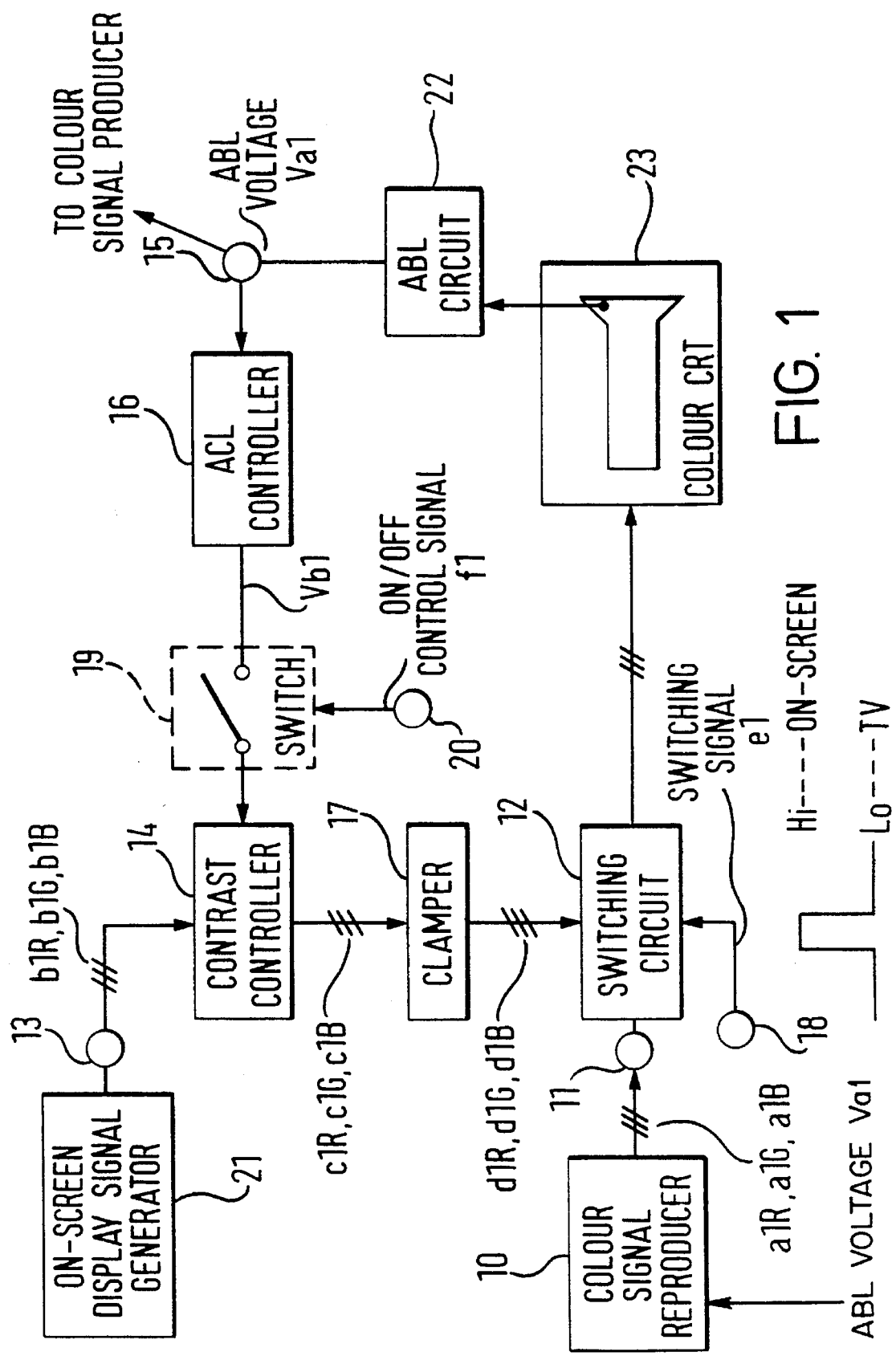
FIG. 1 is a block diagram showing an embodiment of a television receiver involved in the present invention.

FIG. 1 shows a block diagram of an analog RGB signal processing circuit showing one preferred embodiment of a television receiver involved in the present invention.

In FIG. 1, Reference Numeral 10 is a color signal reproducer to reproduce television R, G and B signals a1R, a1G and a1B from television broadcasted signals. The television R, G and B signals a1R, a1G and a1B led to an input terminal 11 from this color signal reproducer 10 are provided to a switching circuit 12.

Further, Reference Numeral 21 is an on-screen display signal generator and analog R, G and B signals b1R, b1G and b1B provided to an input terminal 13 from this on-screen display signal generator 21 are supplied to a contrast controller 14.

Reference Numeral 22 is an ABL circuit to generate an ABL an voltage which varies following the anode current of a color CRT 23. ABL voltage Va1 is provided to an input terminal 15 from the ABL circuit 22. The ABL voltage Va1 provided to this input terminal 15 is supplied to an ACL controller (Automatic Contrast Limit Controller) 16. Further, the color signal reproducer 10 is controlled using this ABL voltage Va1, thus controlling the contrast of television R, G and B signals a1R, a1G and a1B.

The ACL controller 16 generates contrast control voltage Vb1 using the supplied ABL voltage Va1 and supplies it to one of the terminals of the switch 19. Another terminal of the switch 19 is connected to a contrast control voltage input terminal of the contrast controller 14.

On the other hand, ON/OFF control signal f1 is provided via an I2 C bus to an input terminal 20. This ON/OFF control signal f1 has the low level to show ON of the ACL operation to the on-screen R, G and B signals in the mode where a ratio of the on-screen display occupied in the whole screen exceeds a prescribed level and has a high level to show OFF of the ACL operation in a mode where the ratio of on-screen display occupied in the whole screen becomes below the prescribed level in such a case as channel display, etc. This ON/OFF control signal f1 is provided to the switching signal input terminal of the switch 19. The switch 19 is turned ON when the ON/OFF control signal f1 is at the low level to supply the contrast control voltage Vb1 from the ACL control circuit 16 to the contrast control voltage input terminal of the contrast controller 14, and is turned OFF when the ON/OFF control signal f1 is at the high level to prevent the contrast control voltage Vb1 from being applied to the contrast control voltage input terminal of the contrast controller 14.

The contrast controller 14 adjusts the amplitudes of the R, G and B signals b1R, b1G and b1B from the input terminal 13 based on the contrast control voltage Vb1 and supplies them as the contrast controlled R, G and B signals c1R, c1G and c1B to a clamper 17. If the contrast control voltage Vb1 was not supplied, the R, G and B signals b1R, b1G and b1B from the input terminal 13 are provided to the clamper 17 as they are. Being in the structure as described above, the contrast controller 14 and the ACL controller 16 form a means to control the contrast of the on-screen R, G and B signals b1R, b1G and b1B corresponding to the ABL voltage Va1, and the switch 19 serves as an ON/OFF control means to select whether the contrast control is to be performed.

The clamper 17 reproduces DC components for the supplied R, G and B signals c1R, c1G and c1B and applies them as R, G and B signals d1R, d1G and d1B to the switching circuit 12.

On the other hand, a switching signal e1 showing a timing to display the on-screen R, G and B signals d1R, d1G and d1B is provided to an input terminal 18 of this switching circuit 12. The switching signal e1 has a high level at a timing to display the on-screen R, G and B signals d1R, d1G and d1B on the screen and has a low level in other cases.

The switching circuit 12 selectively switches and outputs the input on-screen R, G and B signals and TV R, G and B signals, and this switching is performed by the switching signal e1.

When the switching signal e1 is at the high level, the switching circuit 12 selects the on-screen R, G and B signals d1R, d1G and d1B received from the clamper 17 and provides them to a color CRT and when the switching signal e1 is at the low level, selects the TV R, G and B signals a1R, a1G and a1B from the input terminal 11 and leads them to the color CRT.

The operations of the embodiment as described above will now be explained.

In a mode where a ratio of the on-screen display occupied in the whole screen is below a prescribed level, for instance, in a mode such as channel display mode, etc., the ON/OFF control signal f1 provided to an input terminal 20 has a high level and the switch 19 is turned OFF. As a result, the R, G and B signals b1R, b1G and b1B from the input terminal 13 pass directly through the contrast controller 14 and these R, G and B signals with DC components reproduced by the clamper 17 are provided to the switching circuit 12 as analog R, G and B signals d1R, d1G and d1B.

On the other hand, in a mode where a ratio of the on-screen display occupied in the whole screen is above a prescribed level as in a case where on-screen characters are displayed on the whole screen, the ON/OFF control signal f1 provided to the input terminal 20 has a low level, the switch 19 is turned ON, the ACL controller 16 generates the contrast control voltage Vb1 based on ABL voltage Va1 and supplies it to the contrast controller 14. The R, G and B signals b1R, b1G and b1B supplied through the input terminal 13 are controlled for the contrast based on the contrast control voltage Vb1 and after DC components are reproduced by the clamper 17, they are provided to the switching circuit 12. The switching circuit 12 selectively switches the contrast controlled analog R, G and B signals d1R, dqG and d1B from the clamper 17 and TV R, G and B signals a1R, a1G and a1B from the input terminal 11 and display them on a color CRT.

According to the embodiment as described above, it is possible to display the on-screen R, G and B signals on a color CRT after the contrast control is applied based on the ABL voltage in a case where a ratio of the on-screen display occupied in the whole screen is above a prescribed level, and to display them on a color CRT without applying the contrast control in a case where a ratio of the on-screen display occupied in the whole screen is not above this level, such as in a channel display mode. etc. Therefore, if a ratio of the on-screen display occupied in the whole screen is large, it is possible to prevent a CRT and a high voltage circuit from being destroyed and/or deteriorated in the state maintaining a sufficient sense of contrast, while in a case with a ratio of the on-screen display occupied in the whole screen is below a prescribed level, even when the level of applying TV R, G and B signals changes, the contrast of the on-screen R, G and B signals does not change unnecessarily so that brightness is maintained at a constant level. It is thus possible to give a highly favorable impression to TV viewers.

Figure 2:
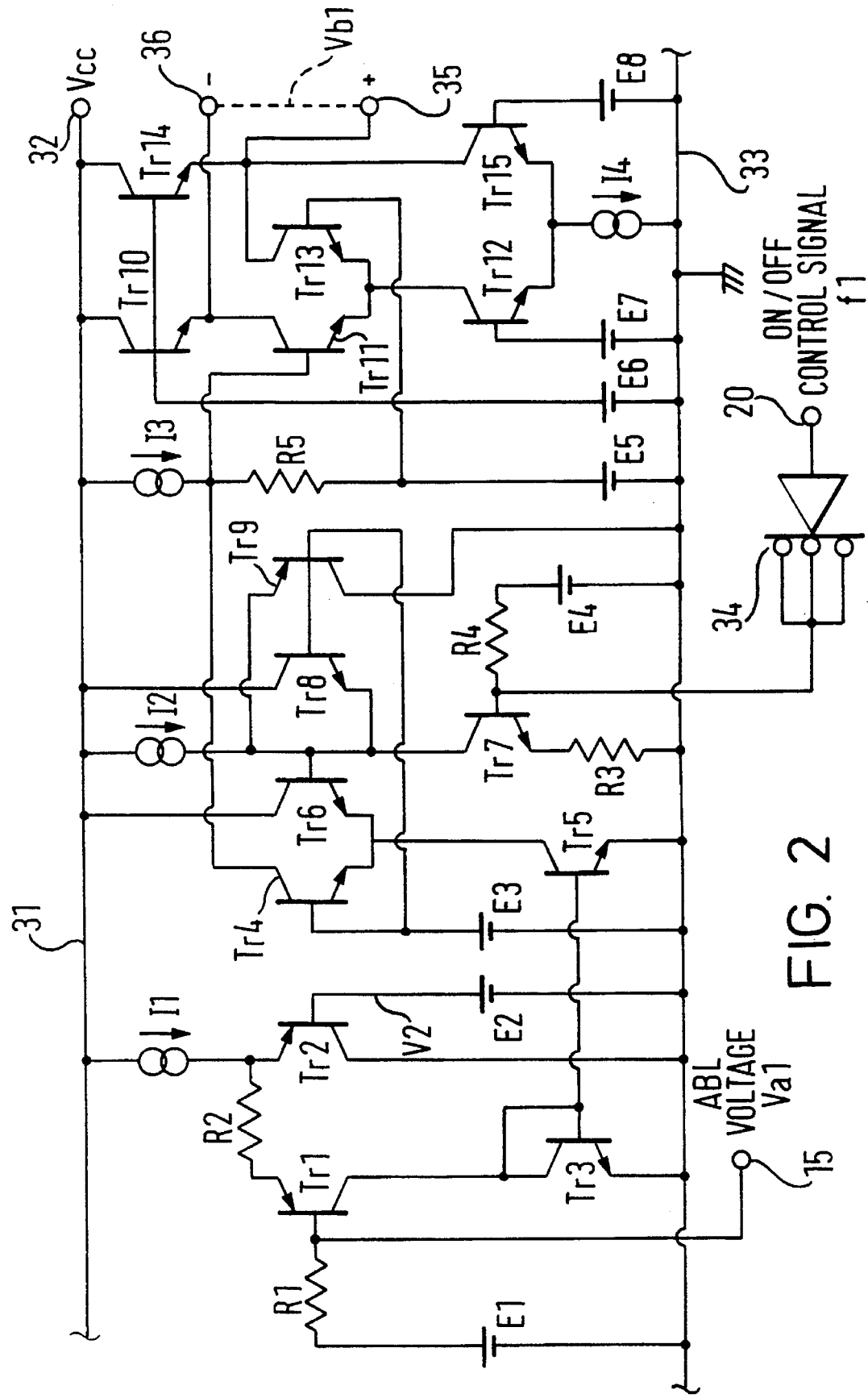
FIG. 2 is a circuit diagram of the switch and the ACL controller shown in FIG. 1.

FIG. 2 shows a circuit diagram of the switch 19 and the ACL controller 16 shown in FIG. 1.

In FIG. 2, portions of transistors Tr1–Tr3 and Tr5 comprise a circuit to generate current which varies in response to the ABL voltage, portions of transistors Tr4, Tr6–Tr9 comprise a switching circuit to select whether the contrast control should be performed and portions of transistors Tr10–Tr15 comprise a circuit to generate the contrast control signal.

In FIG. 2, Reference Numeral 31 is a power wire and power voltage Vcc is supplied to this power wire 31 from a terminal 32. This power wiring is connected to current sources I1, I2 and I3 and also, to collectors of NPN transistors Tr6, Tr8, Tr10 and Tr14.

On the other hand, a wiring 33 is connected to the reference point of potential. Further, this wiring 33 is connected to the cathode terminals of DC power sources E1, E2, E3, E4, E5, E6, E7 and E8 and also, to the current source I4.

The current source I1 is connected to the emitter of the PNP transistor Tr2 and also, to the emitter of the PNP transistor Tr1 via a resistor R2.

The base of the PNP transistor Tr1 is connected to an input terminal 15 to which the ABL voltage Va1 is provided and also is connected to the anode terminal of the DC power source E1 via a resistor R1.

The collector of the PNP transistor Tr1 is connected to the wiring 32 via the collector-emitter line of the NPN transistor Tr3 and also, to the bases of the NPN transistors Tr3 and Tr5.

The base of the PNP transistor Tr2 is connected to the anode terminal of the DC power source E2 and its collector is connected to the wiring 33.

The current source I2 is connected to the base of the NPN transistor Tr6 and also, to the wiring 33 via the collector-emitter line of the NPN transistor Tr7 and a resistor R3 which are connected in series. Further, the current source I2 is connected to the wiring 33 via the emitter-collector line of the PNP transistor Tr9. The emitter of the NPN transistor Tr6 is connected to the wiring 33 via the collector-emitter line of the NPN transistor Tr5. The base of the NPN transistor Tr7 is connected to the anode terminal of the DC power source E4 via a resistor R4.

On the other hand, the input terminal 20 to which the ON/OFF control signal f1 is led through the I²C bus is connected to the input terminal of an inverting circuit 34. The output terminal of the inverting circuit 34 is connected to the base of the NPN transistor Tr7.

The current source I3 is connected to the collector of the NPN transistor Tr5 via the collector-emitter line of the NPN transistor Tr4.

The bases of the NPN transistors Tr4 and Tr8 and PNP transistor Tr9 are connected to the anode terminal of the DC power source E3.

Further, the current source I3 is connected to the anode terminal of the DC power source E5 via a resistor R5 and also, is connected to the base of the NPN transistor Tr11.

The anode terminal of the DC power source E5 is connected to the base of the NPN transistor Tr13.

The bases of the NPN transistors Tr10 and Tr14 are connected to the anode terminal of the DC power source E6. The emitters of the NPN transistors Tr10 and Tr14 are connected to the collector of the NPN transistor Tr12 via the collector-emitter lines of the NPN transistors Tr11 and Tr13, respectively. Further, the emitter of the NPN transistor Tr14 is connected to the collector of the NPN transistor Tr15. The bases of the NPN transistors Tr12 and Tr15 are connected to the anode terminals of the DC power sources E7 and E8, respectively. The emitters of the NPN transistors Tr12 and Tr15 are connected to the current source I4.

The emitters of the NPN transistors Tr10 and Tr14 are connected to the contrast control voltage output terminals 35 and 36, respectively. The contrast control voltage output terminals 35 and 36 have a positive polarity and a negative polarity, respectively, and the contrast control voltage Vb1 to be supplied to the contrast adjusting circuit 14 shown in FIG. 1 is generated between them.

The operations of such example as circuit example as described above will be explained.

First, if the ON/OFF control signal f1 provided to the input terminal 20 is at the low level, the output from the output terminal of the inverting circuit 34 becomes the high level and the NPN transistor Tr7 is turned ON. Here, as the collector current of the NPN transistor Tr7 has been so set that it increases more than the current of the current source I2 when the transistor Tr7 is ON, the voltage at the base of the NPN transistor Tr6 drops until the NPN transistor Tr8 is turned ON. As a result, the collector current of the NPN transistor Tr5 flows out of the NPN transistor Tr4.

If the ABL voltage Va1 provided to the input terminal 15 drops lower than the base voltage V2 (the output voltage V2 of the current source E2) of the PNP transistor Tr2 under this state, the PNP transistor Tr1 is turned ON and the NPN transistors Tr3 and Tr5 are turned ON, accordingly. Here, as the collector current of the NPN transistor Tr5 is flowing out of the NPN transistor Tr4, if the ABL voltage Va1 further drops from the state lower than the base voltage V2, the collector current of the NPN transistor Tr5 increases and the base voltage of the NPN transistor Tr11 drops. As a result, the current flowing to the NPN transistor Tr11 decreases and the current flowing to the NPN transistor Tr13 increases and the emitter voltage of the NPN transistors Tr10 and Tr14, that is, the contrast control voltage Vb1 between the contrast control voltage output terminals 35 and 36 drops.

Further, if the ABL voltage Va1 becomes high when the ABL voltage Va1 is lower than the base voltage V2, the collector current of the NPN transistor Tr5 decreases and the base voltage of the NPN transistor Tr11 increases. As a result, the current flowing to the NPN transistor Tr11 increases while the current flowing to the NPN transistor Tr13 decreases and the contrast control voltage Vb1 between the contrast control voltage output terminals 35 and 36 increases. Thus, if the ON/OFF control signal f1 provided to the input terminal 20 is at the low level, it is possible to supply the contrast control voltage Vb1 generated based on the ABL voltage Va1 to the contrast controller 14 shown in FIG. 1.

If the ON/OFF control signal f1 provided to the input terminal 20 is at the high level, the output from the output terminal of the inverting circuit 34 becomes a low level (about 0.2 V) and the NPN transistor Tr7 is turned OFF. As a result, the base voltage of the NPN transistor Tr6 increases until the PNP transistor Tr9 is turned ON by the current from the current source I2 and the collector current of the NPN transistor Tr5 flows out of the NPN transistor Tr6. As a result, the collector current of the NPN transistor Tr5 generated by the ABL voltage Va1 does not flow to the base of the NPN transistor Tr11 and the contrast control voltage Vb1 remains unchanged even when the ABL voltage Va1 changes.

Further, when voltage from the DC power source E7 is varied under user control, the contrast control by user becomes possible in addition to the ABL operation.

The circuit shown above makes it possible to achieve the switch 19 and the ACL controller 16.

Figure 3:
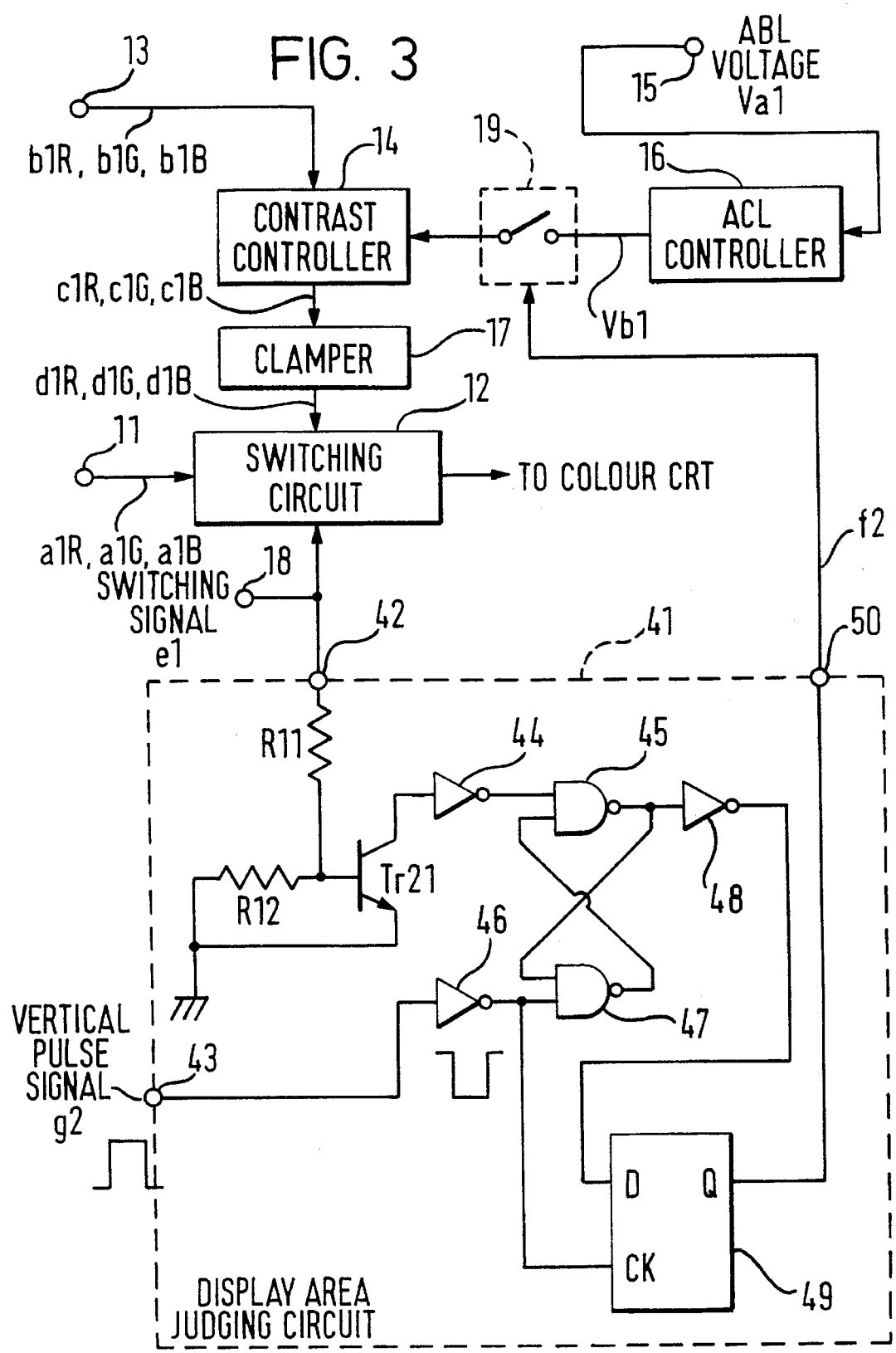
FIG. 3 is a block diagram showing an example of devices that generate a signal for the ON/OFF control of the switch shown in FIG. 1.
Figure 4:
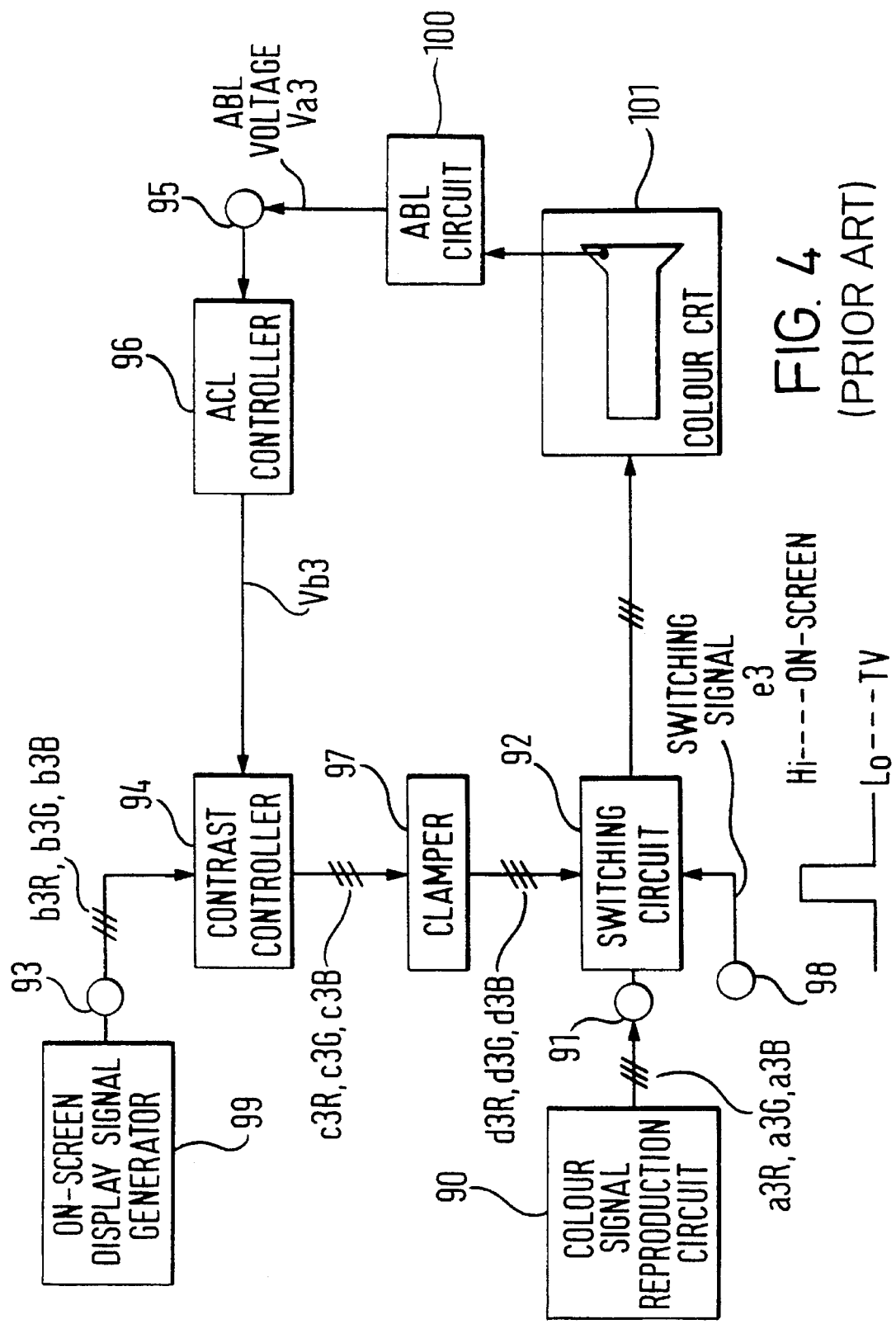
FIG. 4 is a block diagram showing a conventional analog RGB signal processing circuit.

FIG. 3 is a block diagram showing an example of a device that generates a signal to turn the switch 19 ON/OFF. The same elements in FIG. 3 as those in FIG. 1 are assigned with the same reference numerals and their explanation will be omitted.

In FIG. 3, the contrast ON/OFF control means includes a display area judging circuit 41 and the switch 19 in this embodiment. The display area judging circuit 41 judges whether the selector switch circuit has selected TV R, G and B signals throughout the whole area of one vertical period by a vertical pulse signal from a sync separation circuit and a switching signal e1 from an input terminal 18 and based on this judging result, the ON/OFF control signal f2 is generated and led to the switching signal input terminal of the switch 19.

When explained more in detail, the input terminal 18 to which the analog RGB switching signal e1 is provided is connected to an input terminal 42 of the display area judging circuit 41.

On the other hand, a vertical pulse signal g2 from the sync separation circuit is provided to an input terminal 43 of the display area judging circuit 41. This vertical pulse signal g2 is a vertical sync signal which becomes a reference signal for executing the vertical scanning of a CRT.

The input terminal 42 is connected to the reference point of potential via the resistors R11 and R12 which are connected in series. The connecting points of the resistors R11 and R12 are connected to the base of the NPN transistor Tr21. The emitter of the NPN transistor Tr21 is connected to the reference point of potential.

The collector of the NPN transistor Tr21 is connected to a first input terminal of a NAND circuit via an inverting circuit 44.

The input terminal 43 is connected to a first input terminal of a NAND circuit 47 via an inverting circuit 46. Further, the output terminal of the inverting circuit 46 is connected to a clock signal input terminal CK of a D flip-flop 49. The output terminal of the NAND circuit 45 is connected to the second input terminal of the NAND circuit 47. The output terminal of the NAND circuit 47 is connected to the second input terminal of the NAND circuit 45. Further, the output terminal of the NAND circuit 45 is connected to a data input terminal D of the D flip-flop 49 via an inverting circuit 48. The output terminal Q of the D flip-flop 49 is connected to an output terminal 50 of the display area judging circuit 41. The output terminal 50 is connected to the switching signal input terminal of the switch 19. Through these connections, the ON/OFF control signal f2 is provided to the switching signal input terminal of the switch 19 from the output terminal 50 of the display area judging circuit 41.

The contrast control voltage Vb1 from the ACL controller 16 is provided to one of the terminals of the switch 19. Another terminal of the switch 19 is connected to the contrast control voltage input terminal of the contrast controller 14. The switch 19 is turned OFF if the ON/OFF control signal f2 supplied to its switching signal input terminal is at the high level and is turned ON if the ON/OFF control signal f2 is at the low level.

The operations of such the embodiment will be explained in the following.

The switching signal e1 from the input terminal 42 is inverted to the positive polarity twice by the NPN transistor 21 and the inverting circuit 44 and supplied to the NAND circuit 45. The vertical pulse signal g2 from the input terminal 42 is inverted to the negative polarity by the inverting circuit 46 and supplied to the NAND circuit 47. The NAND circuits 45, 47 comprise the RS flip-flop, and the output from the NAND circuit 45 is made to the high level if a signal supplied from the inverting circuit 44 to the NAND circuit 45 changes from the high level to the low level and the output from the NAND circuit 47 is made to the low level. Further, if a signal supplied from the inverting circuit 46 to the NAND circuit 47 is changed from the high level to the low level, the output from the NAND circuit 47 is made to the high level and the output from the NAND circuit 45 is made to the low level. As a result, the output of the NAND circuit 45 is reset to the low level at every one period of the vertical pulse signal g2.

The D flip-flop 49 functions to hold the signal level of the data signal input terminal D at the Q terminal when a signal supplied to the clock signal input terminal CK is at the low level. Therefore, if a signal supplied to the data signal input terminal D from the inverting circuit 48 is at the low level (that is, when the switching signal e1 changed from the high level to the low level during one vertical period) when the vertical pulse of the vertical pulse signal g2 started, the output terminal Q of the D flip-flop 49 outputs the high level ON/OFF control signal f2 to turn the switch 19 OFF and when a signal supplied to the data signal input terminal D from the inverting circuit 48 is at the high level (that is, the switching signal e1 is at the high level throughout the whole area during one vertical period), outputs the low level ON/OFF control signal f2 to turn the switch 19 ON.

According to such the embodiment as described above, it is possible to control the contrast of on-screen display R, G and B signals based on the ABL voltage when on-screen characters are displayed on the whole screen, and to display on-screen display R, G and B signals on a color CRT without performing the contrast control when both on-screen display and TV broadcasting are displayed on one screen in a mode such as a channel display mode, etc. (that is, when the analog switching signal e1 changes from the high level to the low level during one vertical period).

Further, in the embodiment shown in FIG. 1, the ACL operation is switched ON/OFF based on a ratio of the on-screen display occupied in the whole screen, but the ACL operation may be switched ON/OFF based on other prescribed data, for instance, data showing on-screen display modes (whole on-screen display mode, channel display mode, etc.). Further, in the embodiments shown in FIGS. 1 and 3, a switch to turn off the output from the ACL circuit has been provided as a means to turn off the ACL operation but the analog R, G and B signals b1R, b1G, b1B from the input terminal 13 may be supplied directly to the clamper 17 without passing through the contrast controller 14 by other means, for instance, a selector switch.

As the present invention makes it possible to decide whether the contrast control should be applied to on-screen display R, G and B signals corresponding to automatic brightness limit voltage, it is possible to prevent a CRT/high voltage circuit from being destructed/deteriorated while maintaining the sufficient sense of contrast in a mode where a ratio of the on-screen display occupied in the whole screen is higher than a prescribed level and it is also possible to give a highly favorable impression to TV viewers as the contrast of on-screen display R, G and B signals remains unchanged and brightness is kept at a constant level even when the level of television R, G and B signals applied changes.

As described above, the present invention can provide an extremely preferable television receiver.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A television receiver comprising:

first signal processing means receiving television signals and generating contrast controlled first R, G and B signals;

second signal processing means for generating second on-screen R, G and B signals, the second signal processing means controlling the contrast of the second on-screen R, G and B signals if a contrast control signal is provided to the second signal processing means;

switching means receiving the contrast controlled first R, G and B signals and the second R, G and B signals from the first and the second signal processing means, respectively, and selectively outputting one of the first and the second R, G and B signals as an output signal;

a color CRT receiving the output signal from the switching means for displaying a video image corresponding to the output signal;

means for generating an ABL voltage that changes in response to a level of video displayed on the color CRT, the ABL voltage being provided to the first signal processing means for controlling the contrast of the first R, G and B signals and selectively provided to the second signal processing means as the contrast control signal; and control means for selectively providing the contrast control signal to the second signal processing means for controlling the contrast of the second R, G and B signals such that the contrast control is executed if a ratio of video corresponding to the second R, G and B signals with respect to the total amount of video displayed on the color CRT exceeds a prescribed level and such that the contrast control is prohibited if the ratio is below the prescribed level.

2. A television receiver as claimed in claim 1, wherein the control means includes a judging means for judging whether the second set of R, G and B signals have been selected by the switching means so that a whole area of the color CRT during one vertical scanning period displays only the second set of R, G and B signals and for executing the contrast control of the second set of R, G and B signals based on the result this judgment by the judging means.

3. A television receiver comprising:

a color signal generating unit adapted to receive television signals and to generate contrast controlled first R, G and B signals therefrom;

an on-screen display signal generator providing second R, G and B signals;

a contrast controller receiving the second R, G and B signals from the on-screen display signal generator;

a switching circuit receiving the first and the second R, G and B signals from the color signal generating unit and the contrast controller, respectively, and selectively outputting the received signals as a selected output signal;

a color CRT receiving the selected output signal from the switching circuit and displaying a video image corresponding to the selected output signal;

an ABL circuit for generating an ABL voltage that changes in response to a level of video displayed on the color CRT; and a control unit that provides a contrast control signal to the contrast controller if a ratio of a video corresponding to the second R, G and B signals with respect to the total amount of video displayed on the color CRT exceeds a prescribed level and that prohibits the contrast control of the second R, G and B signals if the ratio is below the prescribed level.

4. A television receiver as claimed in claim 3, wherein the control unit includes a judging circuit for judging whether the second set of R, G and B signals have been selected by the switching circuit such that the whole area of the color CRT during one vertical scanning period displays only the second set of R, G and B signals, the judging circuit executing the contrast control of the second set of R, G and B signals based on the result of this judgment.

* * * * *